US012490249B2

United States Patent
Göransson et al.

(10) Patent No.: US 12,490,249 B2
(45) Date of Patent: Dec. 2, 2025

(54) RADIO NETWORK NODE, AND METHOD PERFORMED THEREIN

(71) Applicant: Telefonaktiebolaget LM Ericsson (publ), Stockholm (SE)

(72) Inventors: Bo Göransson, Sollentuna (SE); Joakim Andersson, Veberöd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 358 days.

(21) Appl. No.: 18/030,087

(22) PCT Filed: Oct. 6, 2020

(86) PCT No.: PCT/SE2020/050954
§ 371 (c)(1),
(2) Date: Apr. 4, 2023

(87) PCT Pub. No.: WO2022/075894
PCT Pub. Date: Apr. 14, 2022

(65) Prior Publication Data
US 2023/0371014 A1 Nov. 16, 2023

(51) Int. Cl.
*H04W 72/0457* (2023.01)
*H04B 7/06* (2006.01)
(Continued)

(52) U.S. Cl.
CPC ...... *H04W 72/0457* (2023.01); *H04B 7/0608* (2013.01); *H04W 72/0446* (2013.01);
(Continued)

(58) Field of Classification Search
CPC ............. H04W 72/0457; H04W 72/04; H04W 72/0446; H04W 72/046; H04W 72/048;
(Continued)

(56) References Cited

U.S. PATENT DOCUMENTS 9,572,197 B1 * 2/2017 Wurtenberger ....... H04W 72/04
2017/0366994 A1 12/2017 Akkarakaran et al.
(Continued)

FOREIGN PATENT DOCUMENTS

WO 2018175784 A1 9/2018

OTHER PUBLICATIONS

Author Unknown, "Technical Specification Group Radio Access Network; NR; NR and NG-RAN Overall Description; Stage 2 (Release 15)," Technical Specification 38.300, Version 15.2.0, Jun. 2018, 3GPP Organizational Partners, 87 pages.
(Continued)

*Primary Examiner* — Mohamed A Kamara
(74) *Attorney, Agent, or Firm* — Withrow & Terranova, PLLC

(57) ABSTRACT

Embodiments herein may relate to a method performed by a radio network node for handling communication for a user equipment, UE, in a wireless communication network. The radio network node configures a bandwidth to use for an antenna panel of the radio network node or a part of the antenna panel based on whether communication is for DL communication or UL communication, by configuring a number of elements of the antenna panel, of the radio network node, per carrier for the UE, wherein the number of elements is based on whether communication is for DL communication or UL communication.

12 Claims, 12 Drawing Sheets

(51) Int. Cl.
*H04W 72/0446* (2023.01)
*H04W 72/0453* (2023.01)
*H04W 72/51* (2023.01)

(52) U.S. Cl.
CPC ....... *H04W 72/0453* (2013.01); *H04W 72/51* (2023.01); *H04B 7/0617* (2013.01)

(58) Field of Classification Search
CPC .............. H04W 72/0453; H04W 72/51; H04B 7/0408; H04B 7/0413; H04B 7/0617; H04B 7/0426; H04B 7/0608
See application file for complete search history.

(56) References Cited

U.S. PATENT DOCUMENTS

| | | | |
|---|---|---|---|
| 2019/0007109 A1* | 1/2019 | Ma | H04B 7/0408 |
| 2019/0132830 A1* | 5/2019 | Tabet | H04W 72/21 |
| 2020/0067615 A1 | 2/2020 | Ghanbarinejad et al. | |
| 2022/0256473 A1* | 8/2022 | Kiilerich Pratas | H04W 52/367 |

OTHER PUBLICATIONS

International Search Report and Written Opinion for International Patent Application No. PCT/SE2020/050954, mailed Jul. 2, 2021, 10 pages.

\* cited by examiner

RADIO NETWORK NODE, AND METHOD PERFORMED THEREIN

This application is a 35 U.S.C. § 371 national phase filing of International Application No. PCT/SE2020/050954, filed Oct. 6, 2020, the disclosure of which is incorporated herein by reference in its entirety.

TECHNICAL FIELD

Embodiments herein relate to a radio network node, and a method performed therein for communication. Furthermore, a computer program product and a computer readable storage medium are also provided herein. In particular, embodiments herein relate to enabling or handling communication of a user equipment (UE) efficiently in a wireless communication network.

BACKGROUND

In a typical wireless communication network, user equipments (UE), also known as wireless communication devices, mobile stations, stations (STA) and/or wireless devices, communicate via a Radio Access Network (RAN) to one or more core networks (CN). The RAN covers a geographical area which is divided into service areas or cells, with each service area or cell being served by a radio network node such as a radio access node e.g., a Wi-Fi access point or a radio base station (RBS), which in some networks may also be denoted, for example, a "NodeB" (NB) or "eNodeB" (eNB), "gNodeB" (gNB). A service area or cell is a geographical area where radio coverage is provided by the radio network node. The radio network node communicates over an air interface operating on radio frequencies with the UE within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for UEs. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network and a Fifth Generation (5G) network, have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. New radio (NR) is a new radio access technology being standardized in 3GPP.

The 5G system (5GS) defined by 3GPP Rel-15 introduces both a new generation radio access network (NG-RAN) and a new core network denoted as 5G core (5GC). Similar to E-UTRAN, the NG-RAN uses a flat architecture and consists of base stations, called gNBs, which are interconnected with each other by means of the Xn-interface. The gNBs are also connected by means of the NG interface to the 5GC, more specifically to the Access and Mobility Function (AMF) by the NG-Core (C) interface and to the User Plane Function (UPF) by means of the NG-U interface. The gNB in turn supports one or more cells which provides the radio access to the UE. The radio access technology, called new radio (NR), is orthogonal frequency division multiplex (OFDM) based like in LTE and offers high data transfer speeds and low latency.

5G NR systems deployed on mmWave frequencies within e.g. frequency range 2 (FR2), e.g., 24-56 GHz, are in general UL limited. The main reason is that a typical UE has an output power (e.g. Equivalent Isotropic Radiated Power (EIRP)) of e.g. 23 dBm, while the basestation may have 55-60 dBm EIRP. Hence there may be a 30-40 dB difference between UL and DL.

A typical mmWave radio, inclusive antenna, consists of at least one antenna panel, and a number of radio frequency (RF) application-specific integrated circuits (ASIC) mounted behind the antenna panel. To increase the total output power, it is common to equip the radio with several panels. Using several panels or splitting one panel in several parts may also be a way to increase the bandwidth. For example, a radio ASIC may only support a fraction of the total system bandwidth, and to have full bandwidth support either two (or more) panels are needed, alternatively one antenna panel may be split into several areas each supporting partial bandwidth. A few examples are given in FIG. 1. It is shown an example where two panels are used to achieve 800 MHz of total bandwidth. Below it is also shown that the same function can be achieved by splitting a panel into two parts, each supporting 400 MHz of bandwidth (in this example).

Note that it is herein assumed that two beams can be created per (sub) panel, one per vertical/horizontal (V/H)-polarization. Embodiments herein are by no means limited to this configuration. If several beamforming networks are available (per polarization) several beams can be created. Similarly, if the RF ASIC contain a digital beamforming implementation, the term beamforming network can be seen as the number of ports that are shown towards baseband.

In FIG. 2 another example is shown. In this case both panels are configured to the same frequencies. This means that 4 beams can be used on the same frequency carrier, either for single user Multiple-Input Multiple-Output (SU-MIMO), as shown in the FIG. 2, or for multiple user Multiple-Input Multiple-Output (MU-MIMO), hence two (or more) users are scheduled onto the same frequency resource.

A problem with mmWave systems is the poor UL coverage. As mentioned above, the UE is severely power limited compared to the base station. When configuring two or more panels to cover a large system bandwidth, say e.g. 800 MHz as in the examples above, it is only achieved a two transmission two reception (2T2R) system. Here the term 2T2R should be interpreted as number of ports available to the baseband for further digital processing. Alternatively, the panels can be configured onto the same frequency and then provide a four transmission four reception (4T4R) system which can be used to schedule several users on the same resource (MU-MIMO). To achieve 4T4R over full bandwidth, twice the number of panels are needed, which will make the radio much more expensive.

SUMMARY

An object of embodiments herein is to provide a mechanism for improving, in an efficient manner, performance of the wireless communication network e.g. allocating resources efficiently in the wireless communication network.

According to an aspect the object is achieved by providing a method performed by a radio network node, comprising an antenna panel partitioned in elements, for handling communication for a UE in a wireless communication network. The radio network node configures a bandwidth to use for an antenna panel of the radio network node or a part of the antenna panel based on whether communication is for DL communication or UL communication, by configuring a number of elements of the antenna panel, of the radio network node, per carrier for the UE, wherein the number of elements is based on whether communication is for DL communication or UL communication.

It is furthermore provided herein a computer program product comprising instructions, which, when executed on at least one processor, cause the at least one processor to carry out any of the methods herein, as performed by the radio network node. It is additionally provided herein a computer-readable storage medium, having stored thereon a computer program product comprising instructions which, when executed on at least one processor, cause the at least one processor to carry out the method according to any of the methods herein, as performed by the radio network node.

According to another aspect the object is achieved by providing a radio network node, comprising an antenna panel partitioned in elements, for handling communication for a UE in a wireless communication network. The radio network node is adapted to configure a bandwidth to use for an antenna panel of the radio network node or a part of the antenna panel based on whether communication is for DL communication or UL communication, by configuring a number of elements of the antenna panel, of the radio network node, per carrier for the UE, wherein the number of elements is based on whether communication is for DL communication or UL communication.

Embodiments herein thus, achieve better UL coverage by reconfiguring the elements e.g. radio resources during UL timeslots. Since the UE is power limited, it has to transmit on a much smaller bandwidth than the base station. As mentioned above, there could be 30-40 dB difference in EIRP. By transmitting on a smaller bandwidth, the power spectral density (PSD) of the UL signal will be above the detection threshold and hence the UE will be within coverage. Full DL bandwidth and good UL performance can be achieved without the need for additional hardware in a more optimal manner.

BRIEF DESCRIPTION OF THE DRAWINGS

Embodiments will now be described in more detail in relation to the enclosed drawings, in which.

DETAILED DESCRIPTION

Embodiments herein are described within the context of 3GPP NR radio technology (3GPP TS 38.300 V 15.2.0 (2018 June)). It is understood, that the embodiments herein are equally applicable to wireless access networks and UEs implementing other access technologies and standards. NR is used as an example technology in the embodiments herein, and using NR in the description therefore is particularly useful for understanding the problem and solutions solving the problem. In particular, the embodiments herein are applicable also to 3GPP LTE, or 3GPP LTE and NR integration, also denoted as non-standalone NR.

Figure 3:
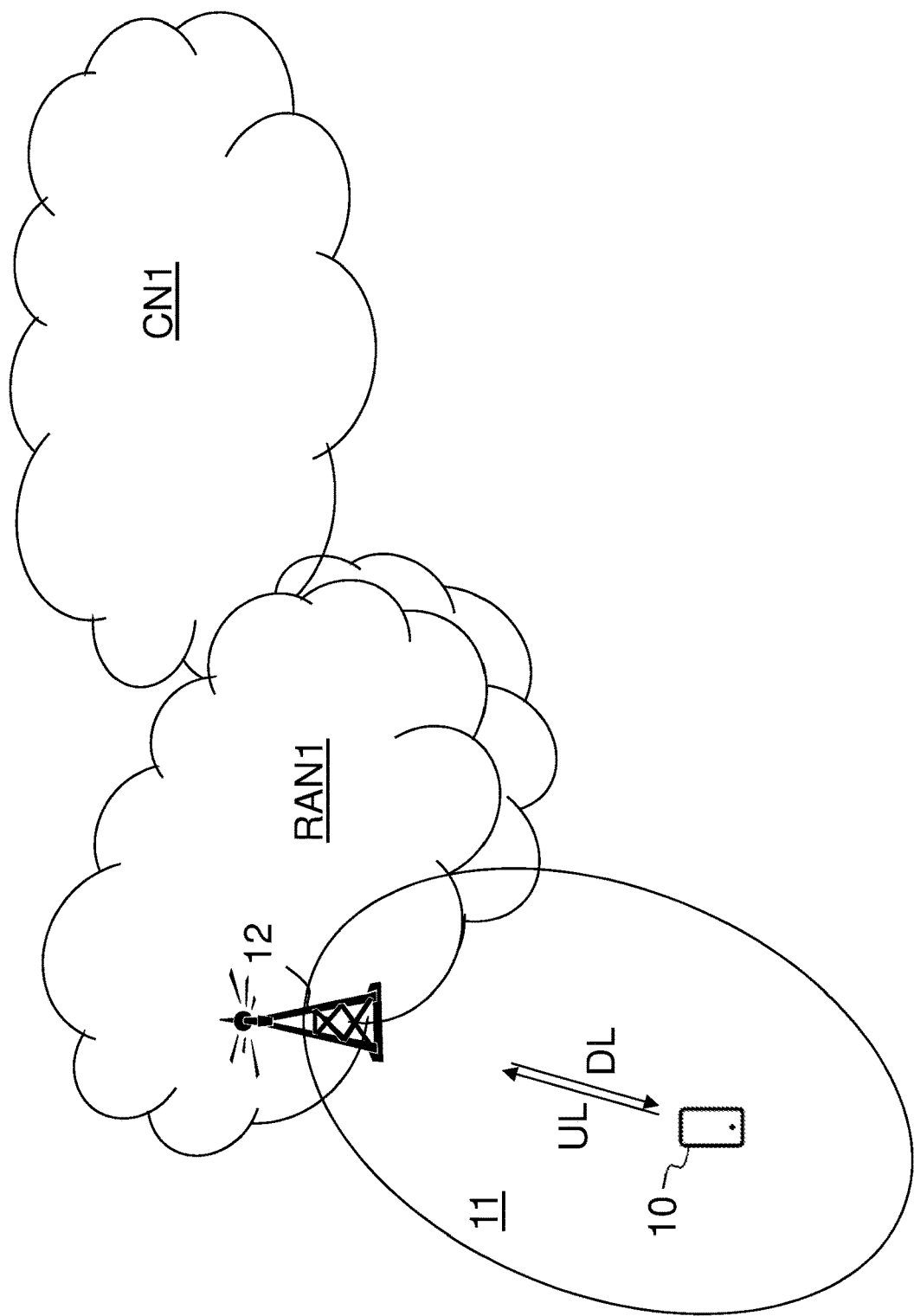
FIG. 3 is a schematic overview depicting a wireless communication network according to embodiments herein.

Embodiments herein relate to wireless communication networks in general. FIG. 3 is a schematic overview depicting a wireless communication network 1. The wireless communication network 1 comprises one or more RANs e.g. a first RAN (RAN1), connected to one or more CNs e.g. a first CN1. The wireless communication network 1 may use one or more technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a UE 10 such as a mobile station, a non-access point (non-AP) station (STA), a STA, a UE and/or a wireless terminal, are connected via the one or more RANs e.g. RAN1, to the one or more CNs e.g. CN1. It should be understood by those skilled in the art that "UE" is a non-limiting term which means any terminal, wireless communication terminal, communication equipment, Machine Type Communication (MTC) device, Device to Device (D2D) terminal, internet of things (IoT) capable device, electronic device e.g. smart phone, laptop, mobile phone, sensor, relay, mobile tablets or any device communicating within a cell or service area.

The wireless communication network 1 comprises a radio network node 12. The radio network node 12 is exemplified herein as a first radio network node or a first RAN node providing radio coverage over a geographical area, a first service area 11, of a first radio access technology (RAT), such as NR, LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a UE 10 within the service area served by the radio network node 12 depending e.g. on the radio access technology and terminology used and may be denoted as a primary radio network node. The radio network node 12 may alternatively be denoted as a serving radio network node providing a primary cell for the UE 10.

It should be noted that a service area may be denoted as cell, beam, beam group or similar to define an area of radio coverage. The radio network node may be a standalone node comprising e.g. a baseband (BB) unit and radio units separated over same or different hardware or a distributed network node distributed over a plurality of network nodes or hardware.

Embodiments herein disclose a solution for providing full DL bandwidth and good UL performance without the need for additional hardware. This is done by configuring a bandwidth to use for an antenna panel or a part of the antenna panel of the radio network node 12 based on whether communication is for downlink communication or uplink communication. This is performed by configuring a number of elements of the antenna panel, of the radio network node 12, per carrier for the UE 10, wherein the number of elements is based on whether communication is for DL communication or UL communication. The number of elements of the antenna may for example be increased for a carrier of the UE 10 in the UL compared to the number of elements of the antenna for a carrier of the UE 10 in the DL. Thus, reconfiguration may occur for carriers that are needed for DL and UL. If less carriers are needed for UL, which is normally the case, the part of the antenna panel not needed for the extra DL carriers may be used as an additional antenna for the set of UL carriers.

Figure 4:
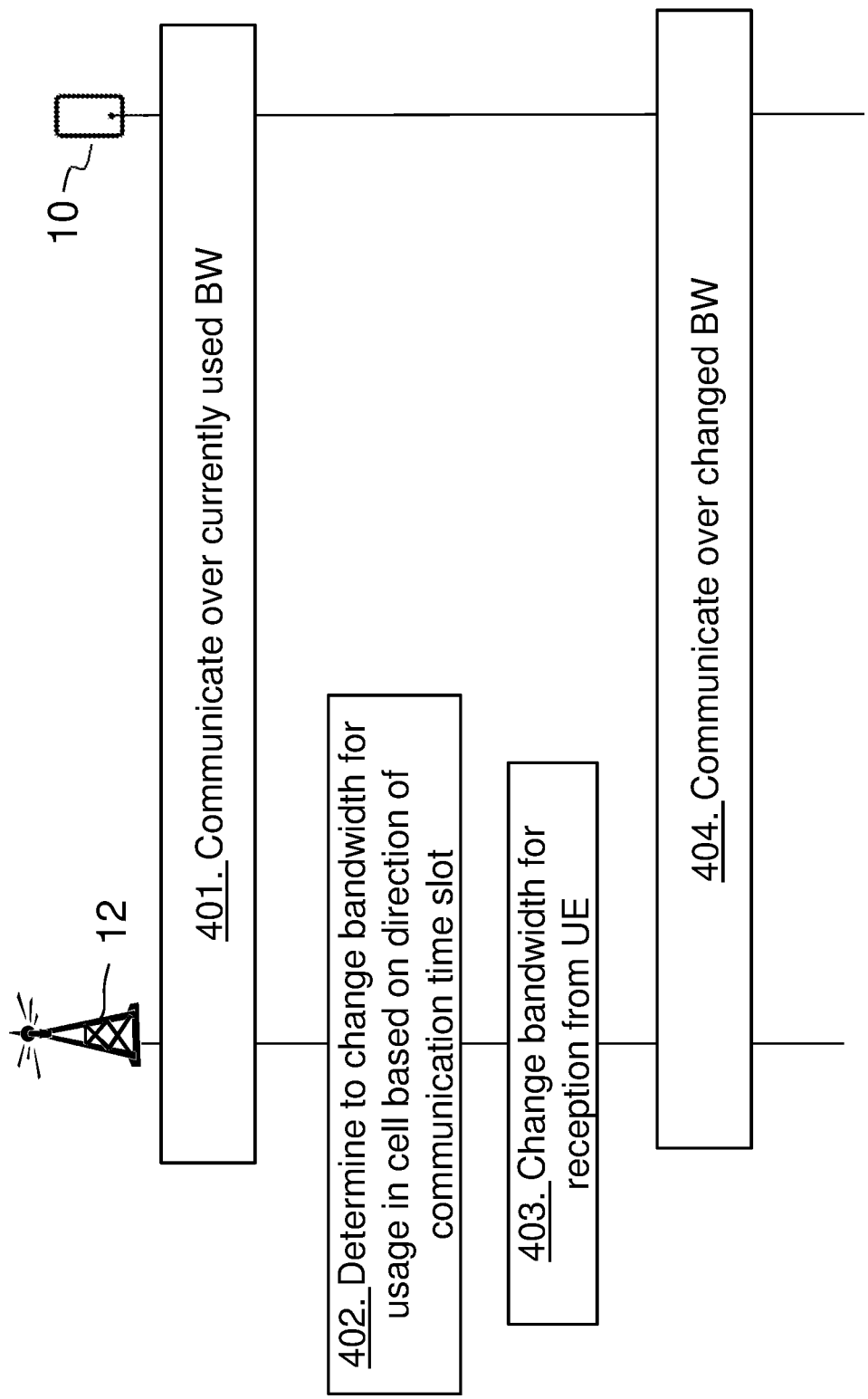
FIG. 4 is a combined signalling scheme and flowchart according to embodiments herein.

FIG. 4 is a combined flowchart and signalling scheme according to some embodiments herein.

Action 401. The UE 10 and the radio network node 12 communicates e.g. the radio network node 12 is transmitting an amount of data to the UE 10 over an antenna panel configured with a DL bandwidth e.g. a first carrier with a first bandwidth and a second carrier with a second bandwidth.

Action 402. The radio network node 12 may determine to change bandwidth for usage in the cell based on direction of communication time slot. E.g. the next time slot is an UL slot.

Action 403. The radio network node 12 may then change bandwidth for the UL slot. E.g. the radio network node 12 may change centre frequency for the second carrier to a first centre frequency of the first carrier. The radio network node 12 may change number of antenna elements that are allocated to each carrier. For example, the radio network node 12 may change such that in worse conditions more antenna elements are allocated to each carrier, hence fewer carriers per UE. Hence, the UE 10 has several carriers, at least one per (sub) panel, and the radio network node 12 reconfigures so that one channel is received on multiple (sub) panels, and by this the UE has higher gain. As an example; assume an antenna panel with 8×8 antenna elements (in total 64 elements) and these are fed with 4 RF ASICs, each ASIC supporting 16 antenna elements (outputs/inputs to the RF ASIC) and can handle 400 MHz. To support 800 MHz, 2 ASICSs are configured (and hence using 32 antenna elements) for the first 400 MHz, and the rest (32 branches from 2 ASICs) are configured to the next 400 MHz. This is a typical DL allocation, where the array is split in 2 (in this example) to support wider bandwidth than what 1 ASIC can support. In this case we will have half the antenna gain, and half of the power compared to the case when we use all antenna elements and all ASICs to support 400 MHz. Hence we trade EIRP with bandwidth. Then in the UL (receive) case there is no need to support 800 MHz, if the UEs only transmit on for example 400 MHz. So all ASICs may be configured to the same frequency range (hence the number of antenna elements are increased per carrier) and will then gain 3 dB (doubling) since there is a larger antenna area per MHz. Thus one may also state that the number of ASICs (or potentially parts of an ASIC) are reconfigured to support either the same frequency as another ASIC, and by this the antenna area, for reception (UL), or configured for another (adjacent) carrier frequency in case of DL transmission.

Action 404. The radio network node may then communicate with the UE 10 e.g. receiving UL transmissions from the UE 10 using the altered bandwidth of the panel i.e. using more elements of the antenna per carrier for the UE.

Normally data from several users are received (or transmitted to), by frequency multiplexing. One may allocate one or more 100 MHz channels to one user, and some other of the 100 MHz channels to other users. In an analog beamforming (BF) implementation, these may need to be in the same direction, but for a digital BF implementation each channel may be in an arbitrary direction. So, in UL at least two choices exist. Either a scheduler configures the system in 'high gain' mode supporting less channels (in the example we go from 800 to 400 MHz and +3 dB gain), or full bandwidth mode with lower gain.

If UEs with coverage problems exist, one may support less channels, and for UEs close to the site a full bandwidth mode may be used. If UEs both on cell edge and in good conditions are scheduled in the same slot, as many carriers needed may be configured.

Figure 5:
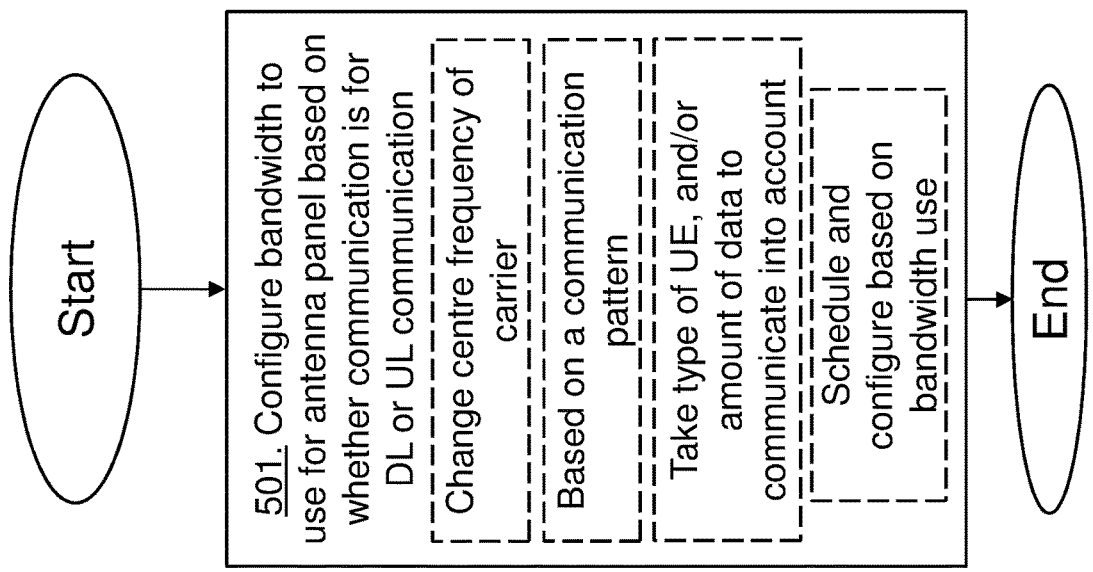
FIG. 5 is a flowchart depicting a method performed by a radio network node according to embodiments herein.

The method action performed by the radio network node 12, comprising an antenna panel partitioned in elements, for handling communication, for example, communication over a plurality of carriers or a bandwidth, for the UE 10 in the wireless communication network according to embodiments will now be described with reference to a flowchart depicted in FIG. 5. Actions performed in some embodiments are marked with dashed boxes.

Action 501. The radio network node configures a bandwidth to use for an antenna panel of the radio network node or a part of the antenna panel based on whether communication is for DL communication or UL communication by configuring the number of elements of the antenna panel, of the radio network node 12, per carrier for the UE 10, wherein the number of elements is based on whether communication is for DL communication or UL communication. A number of carriers/elements is reconfigured to a same number as another antenna panel of the radio network node or another part of the antenna panel for UL communication. The bandwidth may differ when the communication is for DL communication compared to UL communication. The bandwidth may be smaller when the communication is for UL communication compared to the bandwidth for DL communication. The radio network node may take type of the UE, channel quality such as Signal to Interference plus Noise Ratio (SINR) or similar, and/or amount of data to communicate into account when configuring the bandwidth i.e. the number of elements per carrier. The radio network node 12 may configure the bandwidth based on a communication pattern for UL and DL allocation in time slots in a radio frame for the UE. The bandwidth may be changed from DL communication to UL communication by changing a centre frequency of a carrier for communication. This is applicable to time division duplex (TDD) systems and since each channel or carrier occupies a certain frequency, i.e. a bandwidth around the centre frequency, it is the centre frequency of that channel that changes upon reconfiguration of the bandwidth, and in case of a number of carriers, it is the centre frequency of that frequency block that is changed. E.g. the centre frequency of one or more of the transmission carriers are changed to be on reception carrier of a lower bandwidth for a reception slot.

In addition, carrier allocations may be contiguous (all carriers are neighbours) and a block of carriers are moved to reconfigure bandwidth, however, it may also be possible to move only one or two carriers of a block.

The radio network node 12 may schedule UL transmissions and configure bandwidth based on use of bandwidth for the UE e.g. a UE close to the site can transmit with larger bandwidth. A user with coverage issues transmit with lower bandwidth, and the receiver may be configured to higher gain, which means that a lower UL bandwidth is supported in the system during these slots, and hence that many UEs in these slots may not be frequency multiplexed. A scheduler at the radio network node 12 may pair UL transmissions based on the bandwidth use of the UE. The scheduler may pair UEs on cell edge that can transmit on a small bandwidth and one may receive them with high gain. The scheduler may pair UEs with good channels on a larger bandwidth and one may receive them with full bandwidth but lower gain since the bandwidth is not reconfigured for UL transmissions in these slots.

The radio network node 12 will reconfigure its radio between UL and DL slots. For DL slots, where DL power is less of a problem, it may configure each panel to separate frequencies. By this the radio network node 12 may transmit over a large bandwidth (800 MHz in the example given here) and hence provide large capacity. For UL slots, it will configure both panels (or subpanels) to the same frequencies and hence provide 4Rx branches to baseband. These branches can then be combined by the traditional baseband receiver in a MRC or IRC fashion, and by this provide at least 3 dB additional coverage. Embodiments herein take the radio resources used to create frequency coverage, e.g. 2 radio resources each capable of 400 MHz each, together creating 1T 800 MHz spectrum, and reconfigure them to instead create a MIMO system, i.e. in the same example 2 radio resources creating 2R 400 MHz system. Thus, creating a transmission layer of a 800 MHz resource, and use these 2 resources to create 2 reception ports (2R) over 400 MHz. Any number can of course transfer to any number as long as the total BW of the radio resources is respected. Thus, embodiments herein provide a full DL bandwidth and good UL coverage performance achieved without the need for additional hardware.

A typical radio e.g. a mmWave radio, of the radio network node consists of one or several antenna panels with RF ASICs mounted on the backside. Each radio frequency (RF) application-specific integrated circuit (ASIC) will support a number of antenna branches and cover a certain bandwidth, this is sometimes referred to as a Phased Array Antenna Module (PAAM). Normally, the antenna consists of two orthogonal polarizations, e.g. Vertical (V) and Horizontal (H). The RF ASICs contain 2 beamformers that control the phase and relative amplitude of the signal at each transmitter, one per polarization, and hence have two outputs in Reception (Rx) mode. This is referred to a 2T2R system. If a larger bandwidth than supported by one RF ASIC is needed, this is achieved by using several of these PAAMs, or alternatively by splitting the PAAM in e.g. two parts where each part is configured to cover half of the total bandwidth. This is exemplified in FIG. 1, where the upper part shows an example of a dual-panel solution, and the lower part shows a panel-split solution.

In this disclosure it is assumed a total system bandwidth of e.g. 800 MHz and a dual-polarized antenna solution. Each RF ASIC supports 400 MHz of bandwidth and contains two beamformers, one per polarization.

Figure 1:
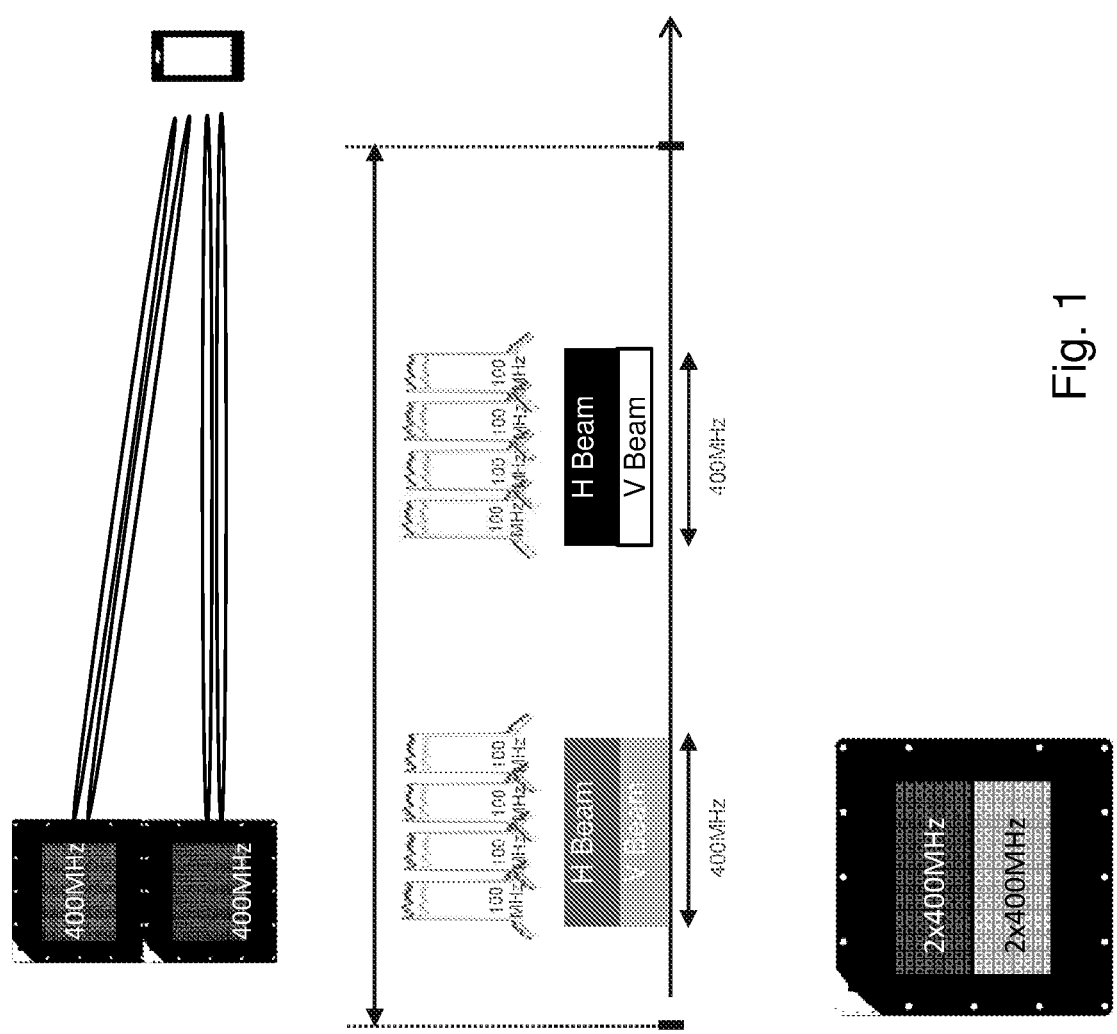
FIG. 1 shows a schematic illustration of beams of antenna panels according to prior art.
Figure 2:
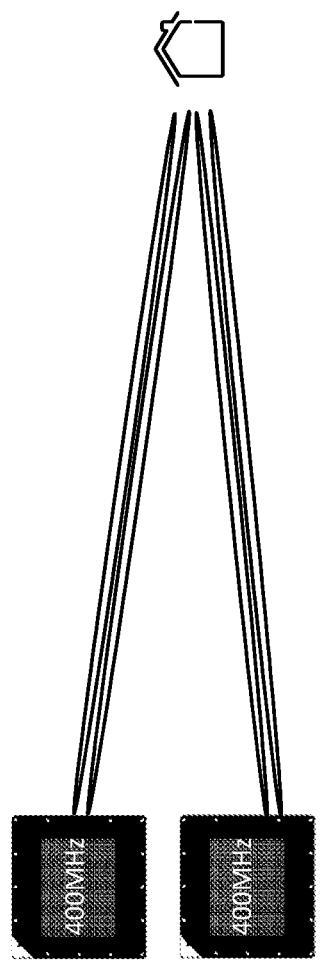
FIG. 2 shows a schematic illustration of beams of an antenna panel according to prior art.

The upper part of FIG. 1 demonstrates a use of a 800 MHz total system bandwidth on each polarization by using two panels. Each beam will have full beamforming gain since the complete antenna aperture is used for beamforming. In contrast, FIG. 1 (lower part) shows the split-panel case. In this configuration, only half of the array is available for each channel, and hence the beamforming gain is 3 dB less than for the dual-panel option. Instead a radio solution that is half in size may be used.

For DL this is a good compromise between performance and size/cost, while for UL the lower beamforming gain for a split panel will severely limit UL coverage. To overcome this UL coverage limitation, it is herein disclosed a way to reconfigure the PAAM such that the UL coverage limitation is reduced.

As already mentioned above, the system is severely UL limited due to the lower output power of the UE compared to the radio network node. This fact is true for most mobile systems but is accentuated for mmWave systems where not only the output power, but also the beamforming gain is much lower for the UE compared to the radio network node. Normally this is solved by scheduling a smaller bandwidth for UL transmissions than for DL transmissions. This means that the PSD for the UL transmission is reasonable. This is also the main reason for why the DL data-rate is much higher than the UL data-rate in a typical cellular system.

Realizing this, it can be understood that the supported UL bandwidth can be smaller than the DL bandwidth without affecting system performance too much. Due to the implementation of a typical mmWave system, the radio between DL and UL slots may be reconfigured to achieve high power wideband DL transmissions, and UL reception utilizing a larger beamforming gain. It is shown in the example in FIG. 6.

Figure 6:
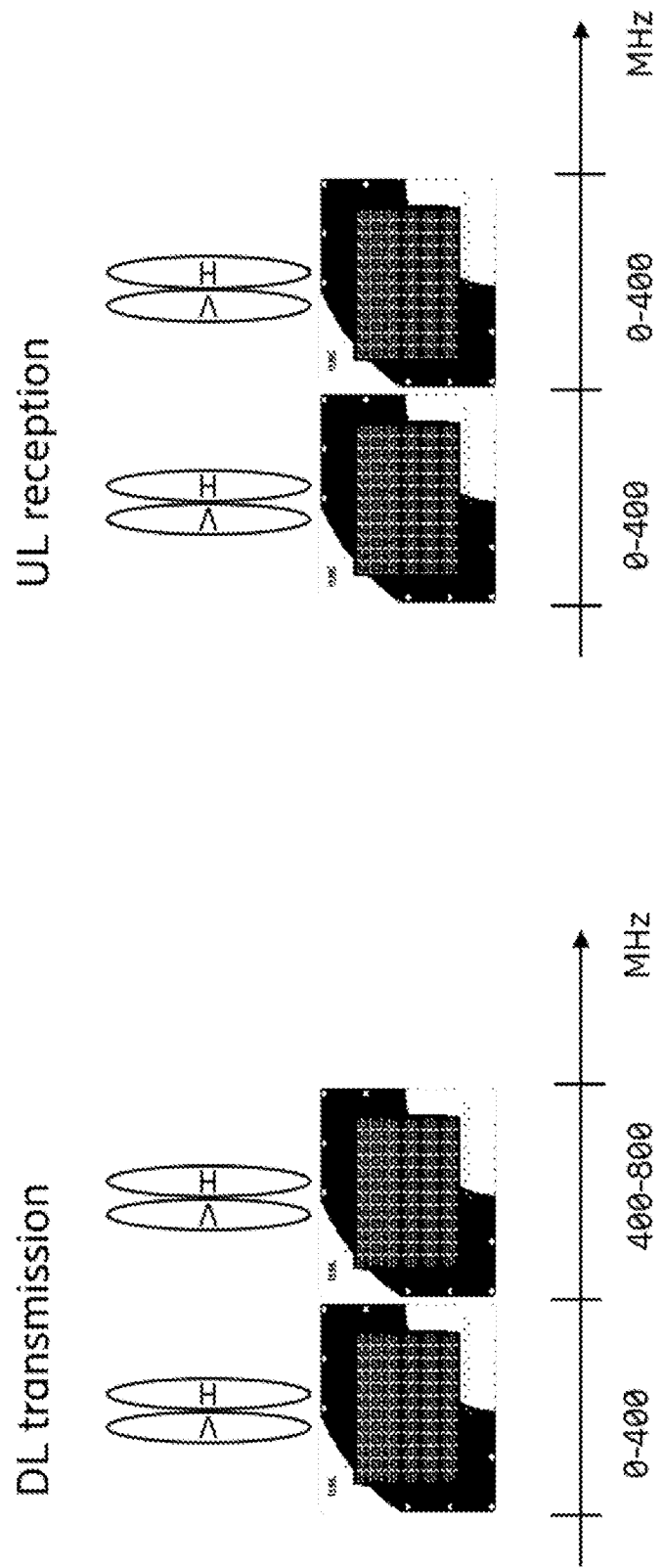
FIG. 6 is a schematic block diagram depicting antenna panels configured to DL transmissions and UL receptions.

FIG. 6 shows a dual-panel option as an example, but it is equally applicable to a split-panel implementation, see FIG. 1 (bottom). In such a case, each PAAM in the figure should be interpreted as a sub-panel part. Also note that it is herein exemplified by a case with 400 MHz bandwidth per PAAM, but of course, any bandwidth can be supported.

During DL transmission slots, each panel generates 2 beams (one per polarization) over its whole bandwidth (400 MHz), and hence it is herein supported with two high power layers over the complete bandwidth by using 2 PAAMs. During UL reception slots, the two panels are configured to the same frequency, and hence 4 Rx ports are available for baseband. By baseband combining, e.g. MRC or IRC, 3 dB additional array gain is achieved. In this particular example, the right hand PAAM is configured to support frequency range 400-800 MHz at transmission slots, while it is configured to the 0-400 MHz frequency range in UL slots.

Figure 7:
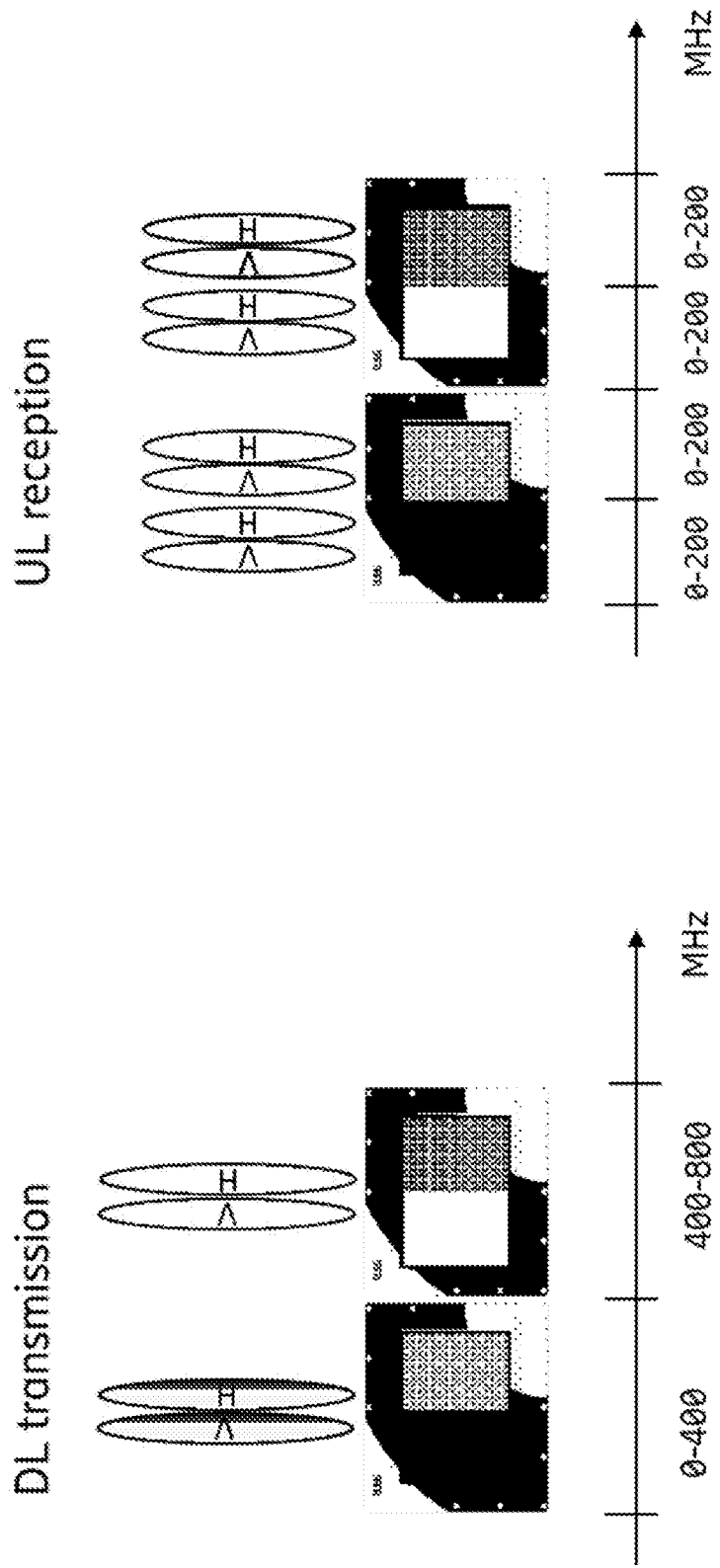
FIG. 7 is a schematic block diagram depicting antenna panels configured to DL transmissions and UL receptions.

An additional example is shown in FIG. 7. This is a more complex situation where panel-split is used for UL reception to create 4 dual-polarized beams, hence 8Rx ports, while still transmitting over 2×400 MHz. Since the sub-panels are created in hardware, the high gain DL beams will be created by coherently combining the two sub-panels to utilize the whole PAAM aperture for each beam. Due to the panel split 8Rx ports are available. In this case it is assumed that an UL transmission is smaller than 200 MHz. Note that in the Figures, all Rx beams point in the same direction. This is just for illustration. In reality it may be advantageous to point them in different directions to capture angular spread in the channel.

Figure 8:
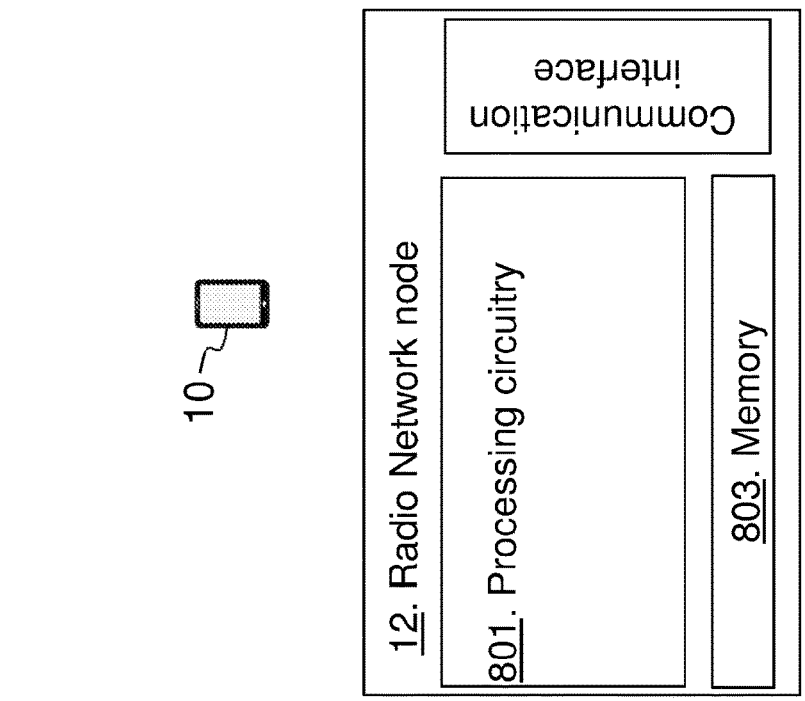
FIG. 8 is a block diagram depicting a radio network node according to embodiments herein.
Figure 8:
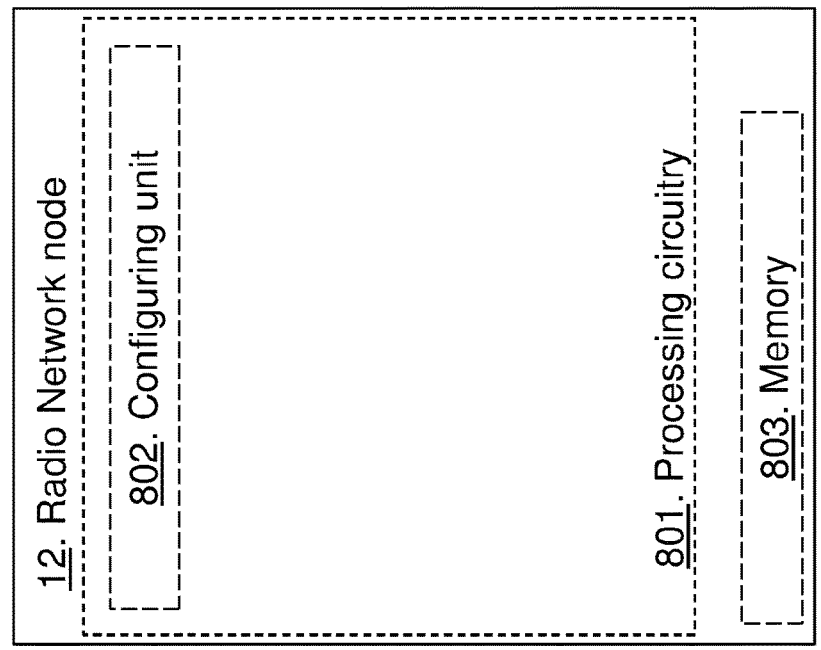
Figure 8:
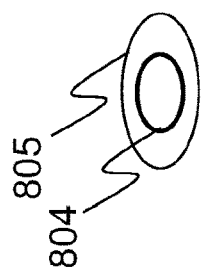

FIG. 8 is a block diagram depicting the radio network node 12 in two embodiments, comprising an antenna panel partitioned in elements, for handling communication for the UE 10 in the wireless communication network according to embodiments herein.

The radio network node 12 such as a radio base station may comprise processing circuitry 801, e.g. one or more processors, configured to perform the methods herein.

The radio network node 12 may comprise a configuring unit 802. The radio network node 12, the processing circuitry 801 and/or the configuring unit 802 is configured to configure the bandwidth to use for the antenna panel of the radio network node or a part of the antenna panel based on whether communication is for DL communication or UL communication, by configuring the number of elements of the antenna panel, of the radio network node, per carrier for the UE, wherein the number of elements is based on whether communication is for DL communication or UL communication. The bandwidth may be smaller when the communication is for UL communication compared to the bandwidth for DL communication (since the number of elements per carrier is increased in the UL). The radio network node 12, the processing circuitry 801 and/or the configuring unit 802 may be configured to configure the bandwidth based on type of the UE, channel quality, and/or amount of data to communicate into account. The radio network node 12, the processing circuitry 801 and/or the configuring unit 802 may be configured to configure the bandwidth based on a communication pattern for UL and DL allocation in time slots in a radio frame for the UE. The bandwidth may be changed from DL communication to UL communication by changing a centre frequency of a carrier for communication. The radio network node 12, the processing circuitry 801 and/or the configuring unit 802 may be adapted to schedule UL transmissions and configure bandwidth based on use of bandwidth for the UE.

The radio network node 12 further comprises a memory 804. The memory comprises one or more units to be used to store data on, such as indications, bandwidths, carrier frequencies, applications to perform the methods disclosed herein when being executed, and similar. Thus, the radio network node 12 may comprise the processing circuitry and the memory, said memory comprising instructions executable by said processing circuitry whereby said radio network node is operative to perform the methods herein. The radio network node 12 may comprise a communication interface comprising a transmitter, a receiver, a transceiver and/or one or more antennas.

The methods according to the embodiments described herein for the radio network node 12 are respectively implemented by means of e.g. a computer program product 805 or a computer program, comprising instructions, i.e., software code portions, which, when executed on at least one processor, cause the at least one processor to carry out the actions described herein, as performed by the radio network node 12. The computer program product 805 may be stored on a computer-readable storage medium 806, e.g. a disc, a universal serial bus (USB) stick, or similar. The computer-readable storage medium 806, having stored thereon the computer program product 805, may comprise the instructions which, when executed on at least one processor, cause the at least one processor to carry out the actions described herein, as performed by the radio network node 12. In some embodiments, the computer-readable storage medium may be a non-transitory or a transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Figure 9:
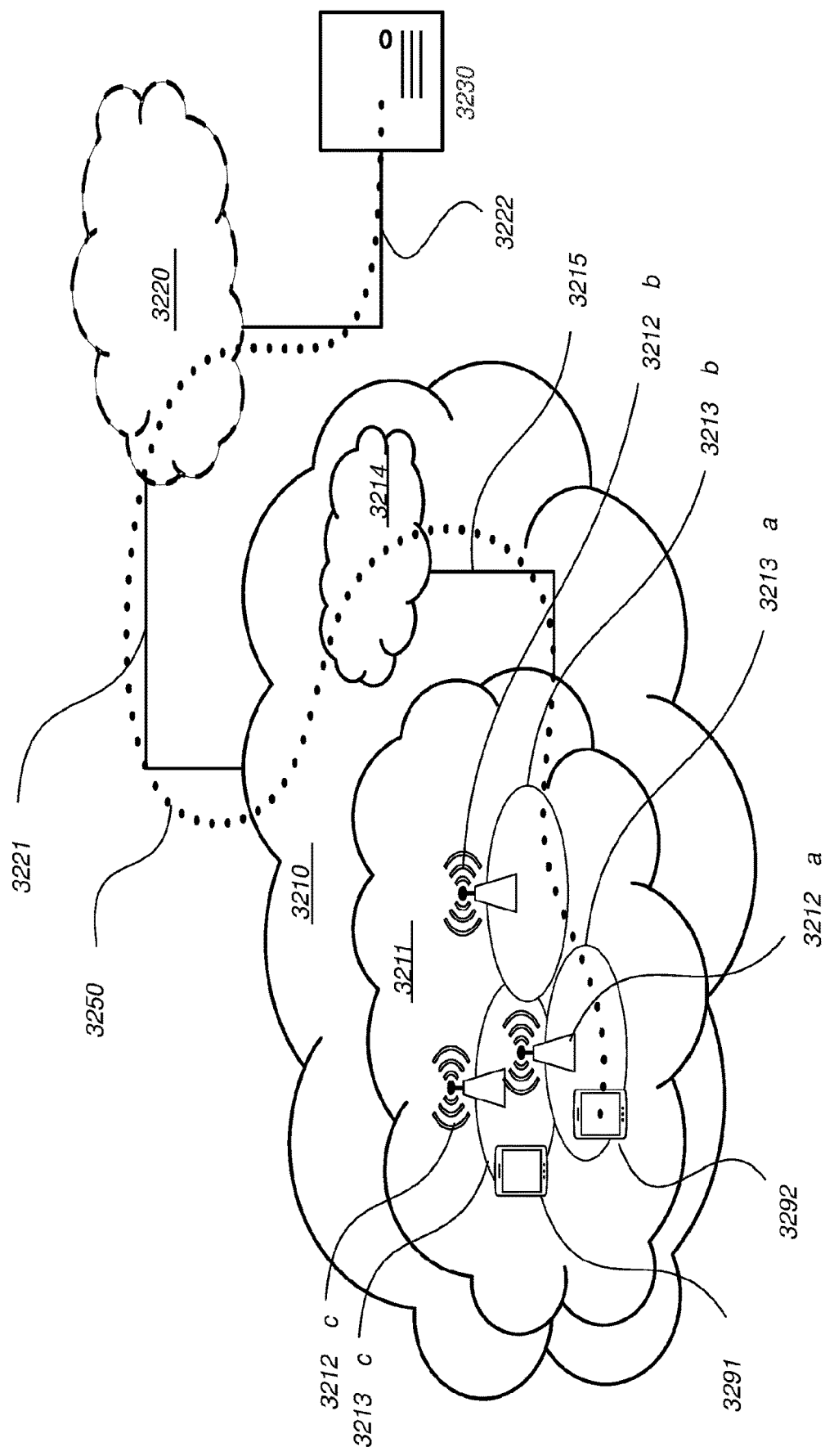
FIG. 9 schematically illustrates a telecommunication network connected via an intermediate network to a host computer.

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network nodes herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
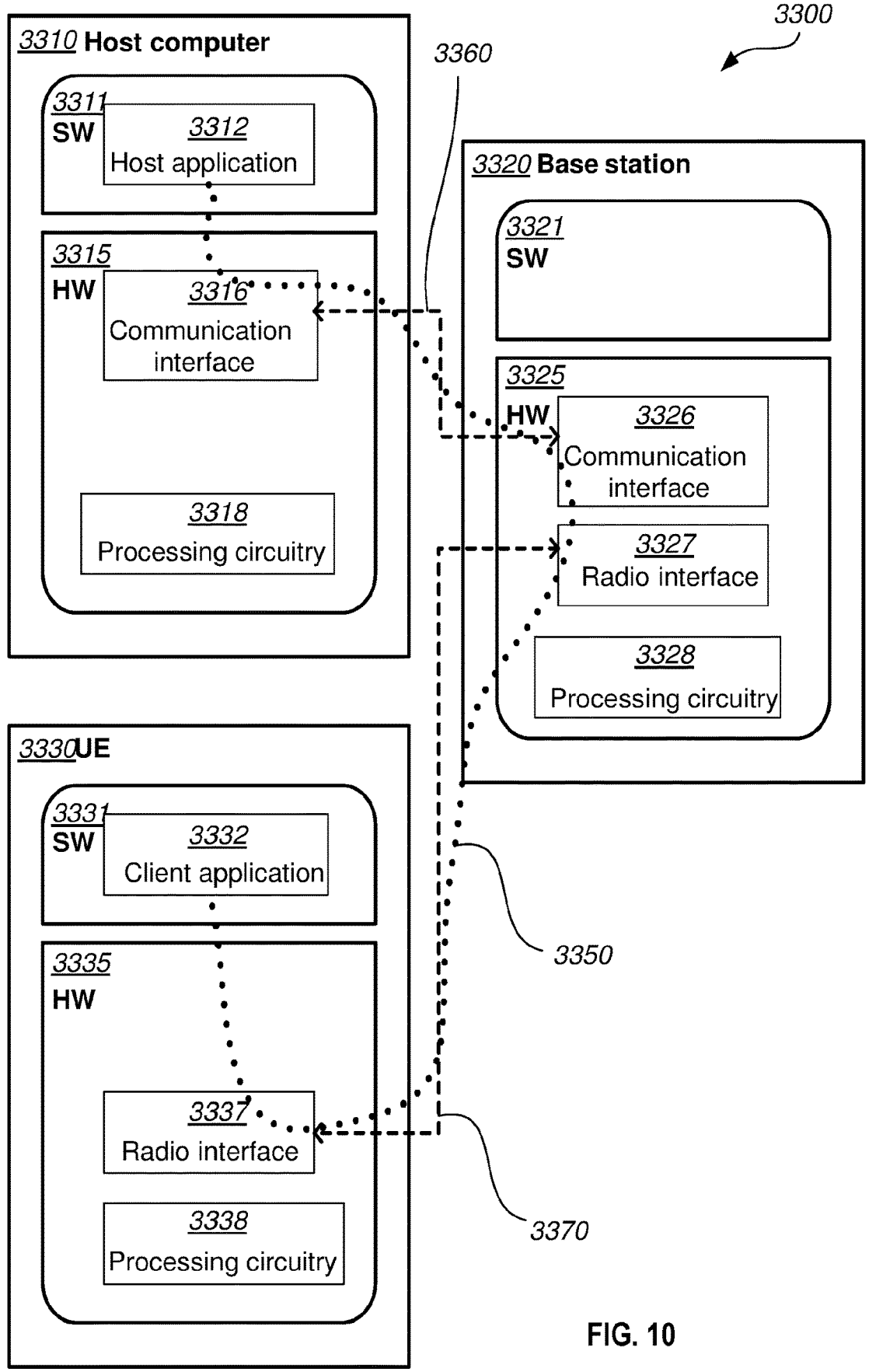
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve handling of radio resources efficiently and thereby provide benefits such as improved performance in the UL.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
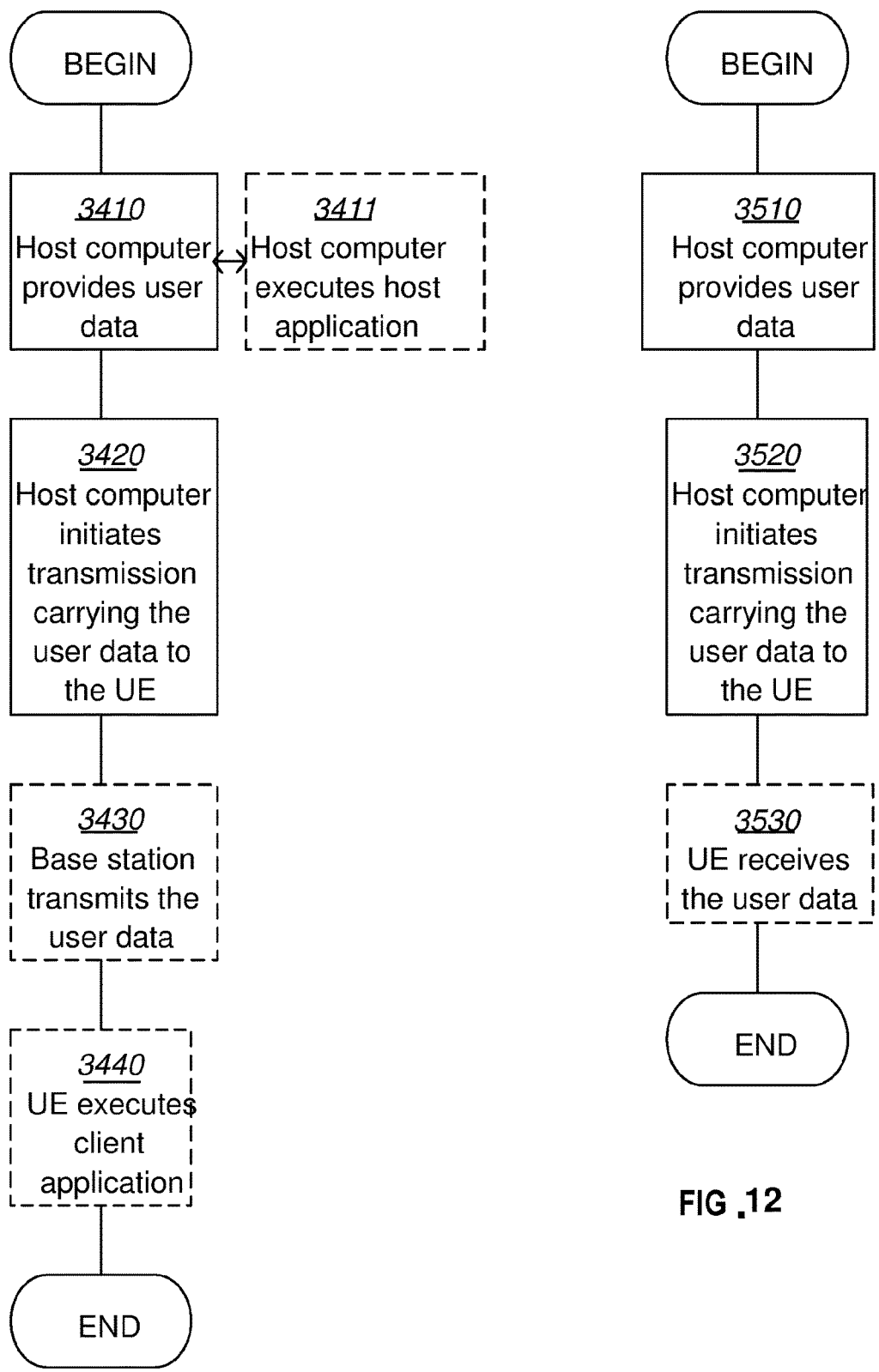
FIGS. 11-14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 13, 14:
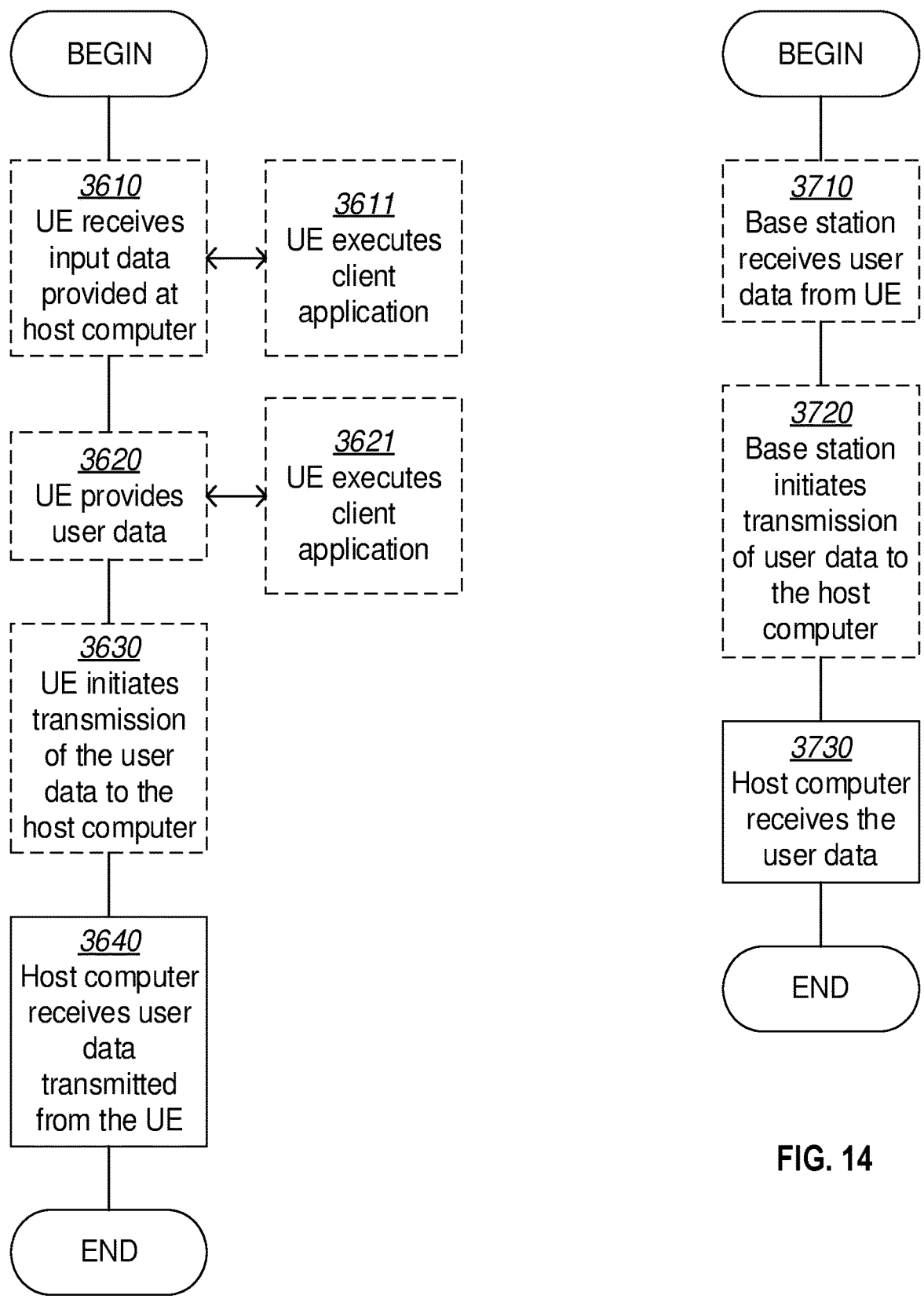

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node, comprising an antenna panel partitioned in elements, for handling communication for a user equipment, UE, in a wireless communication network, the method comprising:

configuring a bandwidth to use for the antenna panel of the radio network node or a part of the antenna panel based on whether communication is for downlink, DL, communication or uplink, UL, communication, by configuring a number of elements of the antenna panel, of the radio network node, per carrier for the UE, wherein the number of elements is based on whether communication is for DL communication or UL communication, wherein the bandwidth is changed from DL communication to UL communication by changing a center frequency of a carrier for communication.

2. The method according to claim 1, wherein the bandwidth is smaller when the communication is for UL communication compared to the bandwidth for DL communication.

3. The method according to claim 1, wherein configuring the bandwidth is further taking type of the UE, channel quality, and/or amount of data to communicate into account.

4. The method according to claim 1, wherein the configuring the bandwidth is based on a communication pattern for UL and DL allocation in time slots in a radio frame for the UE.

5. The method according to claim 1, further comprising:
scheduling UL transmissions and configuration of bandwidth based on use of bandwidth for the UE.

6. A computer program product comprising instructions, which, when executed on at least one processor, cause the at least one processor to:
configure a bandwidth to use for an antenna panel of a radio network node or a part of the antenna panel based on whether communication is for downlink, DL, communication or uplink, UL, communication, by configuring a number of elements of the antenna panel, of the radio network node, per carrier for the UE, wherein a number of elements of the antenna panel is based on whether communication is for DL communication or UL communication, wherein the bandwidth is changed from DL communication to UL communication by changing a center frequency of a carrier for communication.

7. A computer-readable storage medium, having stored thereon a computer program product comprising instructions which, when executed on at least one processor, cause the at least one processor to:
configure a bandwidth to use for an antenna panel of a radio network node or a part of the antenna panel based on whether communication is for downlink, DL, communication or uplink, UL, communication, by configuring a number of elements of the antenna panel, of the radio network node, per carrier for the UE, wherein a number of elements of the antenna panel is based on whether communication is for DL communication or UL communication, wherein the bandwidth is changed from DL communication to UL communication by changing a center frequency of a carrier for communication.

8. A radio network node, comprising an antenna panel partitioned in elements, for handling communication for a user equipment, UE, in a wireless communication network, wherein the radio network node is configured to:
configure a bandwidth to use for the antenna panel of the radio network node or a part of the antenna panel based on whether communication is for downlink, DL, communication or uplink, UL, communication, by configuring a number of elements of the antenna panel, of the radio network node, per carrier for the UE, wherein the number of elements is based on whether communication is for DL communication or UL communication, wherein the bandwidth is changed from DL communication to UL communication by changing a center frequency of a carrier for communication.

9. The radio network node according to claim 8, wherein the bandwidth is smaller when the communication is for UL communication compared to the bandwidth for DL communication.

10. The radio network node according to claim 8, wherein the radio network node is configured to configure the bandwidth based on type of the UE, channel quality, and/or amount of data to communicate into account.

11. The radio network node according to claim 8, wherein the radio network node is configured to configure the bandwidth based on a communication pattern for UL and DL allocation in time slots in a radio frame for the UE.

12. The radio network node according to claim 8, wherein the radio network node is adapted to schedule UL transmissions and configure bandwidth based on use of bandwidth for the UE.

* * * * *